United States Patent [19]

Boyd et al.

[11] Patent Number: 5,021,626
[45] Date of Patent: Jun. 4, 1991

[54] RESISTANCE WELDING APPARATUS

[75] Inventors: Andrew J. Boyd; Anthony D. Corton, both of Wantage, England

[73] Assignee: CMB Foodcan plc, Worcester, England

[21] Appl. No.: 466,463

[22] Filed: Jan. 16, 1990

[30] Foreign Application Priority Data

Feb. 2, 1989 [GB] United Kingdom ............... 8902247

[51] Int. Cl.$^5$ .................................. B23K 11/25
[52] U.S. Cl. ..................................... 219/109; 219/81
[58] Field of Search ............... 219/109, 64, 81, 83, 219/110

[56] References Cited

U.S. PATENT DOCUMENTS 2,818,491 12/1957 Matulaitis ........................ 219/109
4,376,883 3/1983 Dao et al. .
4,788,405 11/1988 Haigh et al. .

FOREIGN PATENT DOCUMENTS 3711771 10/1988 Fed. Rep. of Germany .
3902308 11/1989 Fed. Rep. of Germany .

Primary Examiner—Clifford C. Shaw
Attorney, Agent, or Firm—Burns, Doane, Swecker & Mathis

[57] ABSTRACT

Apparatus for welding longitudinal seams in can bodies includes upper and lower electrode wheels mounted on arms, a transducer for detecting vertical displacement of the upper wheel, a pair of pick-ups for detecting the rotational positions of the wheels, and a single processing circuit. The transducer output is divided into a set of traces, each corresponding to a single wheel rotation. The traces are averaged to produce a representation of the wheel profile. Each wheel profile is subtracted from the transducer output to produce a good indication of weld thickness. Alternatively, the transducer output is divided into a series of traces, each of which represents the vertical displacement of the upper wheel while welding a single can body. These are averaged to provide a good indication of weld thickness. The wheels have surface irregularities and each is inevitably mounted with some degree of eccentricity. Unwanted transducer output components due to these irregularities and eccentricities are removed.

13 Claims, 11 Drawing Sheets

RESISTANCE WELDING APPARATUS

This invention relates to resistance welding apparatus comprising first and second electrode wheels arranged to cooperate to form resistance welds in a series of workpieces and is concerned with monitoring the operation of such apparatus. The invention is particularly, but not exclusively, concerned with apparatus for welding longitudinal seams in the bodies of containers such as are conventionally used for packaging food and aerosol products.

In such an apparatus, each of the electrode wheels is prone to be mounted with some eccentricity. If the eccentricity of either electrode wheel is excessive, it will have an adverse effect on weld quality. It is therefore desirable to monitor the eccentricity of each wheel.

During operation of such apparatus, the surface of each electrode wheel may suffer damage. If such damage is excessive it can have an adverse effect on weld quality. It is thus important to monitor each electrode wheel for the presence of surface irregularities.

It is also desirable to check the thickness of welds produced by such apparatus as weld thickness can indicate weld quality and also errors in the welding process or settings in the welding apparatus.

Simple measurement of the displacement between the electrode wheels during operation of the apparatus cannot be used directly to provide accurate data on the eccentricities and surface irregularities of the two electrode wheels or on weld thickness. This is because the effects of the eccentricities and surface irregularities of the two electrode wheels and the weld thickness are combined.

Accordingly, it is an object of this invention to provide a new or improved resistance welding apparatus in which the eccentricities and surface irregularities of the electrode wheels and weld thickness can be monitored during operation of the apparatus. It is another object of this invention to provide a method of monitoring such apparatus.

According to one aspect of this invention, there is provided resistance welding apparatus comprising frist and second electrode wheels arranged to cooperate to form resistance welds in a series of workpieces, the first and second electrode wheels being mounted for displacement relative to each other, means for sensing the relative displacement between the first and second electrode wheels, said sensing means being arranged to produce an output signal which varies with time as the wheels rotate, and means for processing the output signal, said processing means being arranged to remove or reduce the components of the output signal which relate to the eccentricity and surface irregularities of at least one of said electrode wheels.

By removing or reducing the components in the output signal which relate to the eccentricity and surface irregularity of at least one of the electrode wheels, the output signal from the sensing means can provide useful data. For example, if the components in the output signal relating to the eccentricity and surface irregularity of one of the electrode wheels are removed at a time when the wheels are rotating without welding being performed, the output signal provides data on the eccentricity and surface irregularity of the other electrode wheel. If the components in the output signal relating to the eccentricity and surface irregularity of one, or preferably both, of the electrode wheels are removed at a time when welding is being performed, the output signal provides data on weld thickness.

According to another aspect of this invention, there is provided a method of monitoring resistance welding apparatus having first and second electrode wheels mounted for displacement relative to each other and arranged to form welds in a series of workpieces, said method comprising the steps of: sensing relative displacement between the first and second electrode wheels to produce an output signal which varies with time as the wheels rotate, and processing the output signal to remove or reduce the components in the output signal which relate to the eccentricity and surface irregularities of at least one of said electrode wheels.

This invention will now be described in more detail, by way of example, with reference to the accompanying drawings in which.

Figure 1:
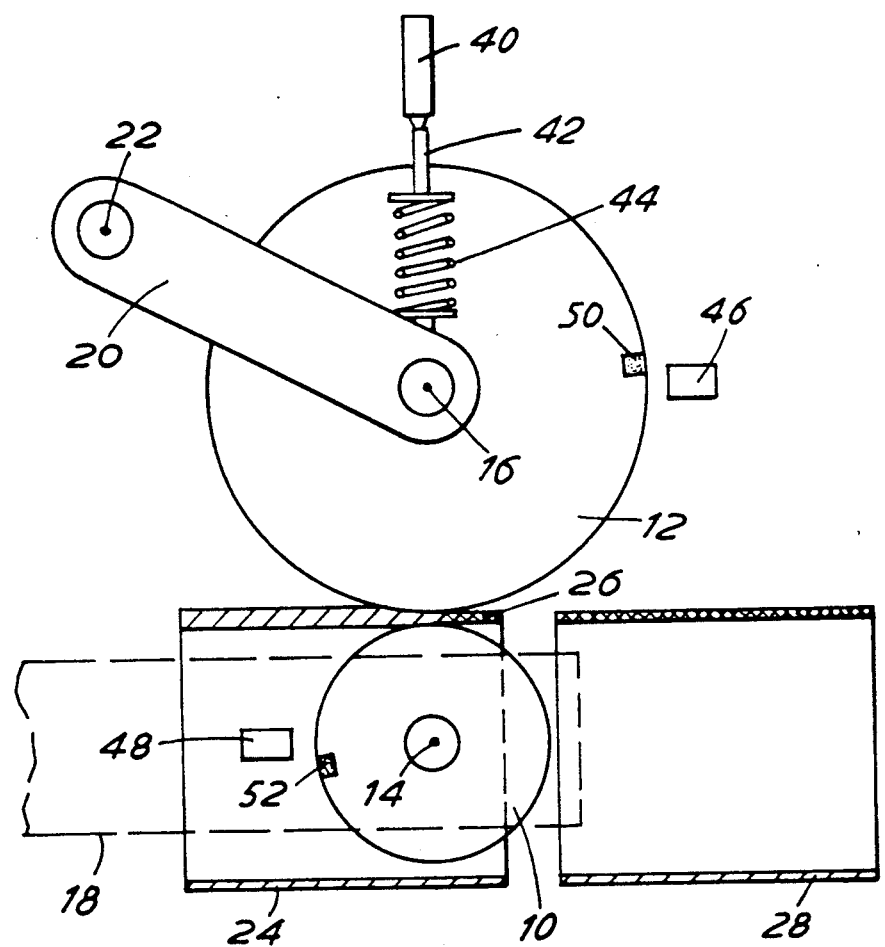
FIG. 1 is a sketch, in side elevation, of part of a resistance welding apparatus embodying this invention for welding longitudinal seams in container bodies.

Referring now to FIG. 1, there is shown part of a resistance welding apparatus for welding longitudinal seams in metal can bodies. The apparatus is basically a welding machine manufactured by Soudronic AG, Switzerland, under their series designation FBB, but modified in accordance with the present invention. (The present invention may also be used with other welding machines which use electrode wheels). The apparatus comprises a lower electrode wheel 10 and an upper electrode wheel 12 mounted, respectively, for rotation about a pair of horizontal axes 14, 16. The wheel 10 is mounted for rotation on the free end of a rigid but cantilevered arm indicated by reference numeral 18. The wheel 12 is mounted for rotation on one end of an arm 20, the other end of which is mounted to swing about a fixed axis 22. Thus, the wheel 12 can be displaced bodily towards and away from the wheel 10.

The arm 20 is biased in a clockwise direction by a pin 42 and a spring 44. The upper end of spring 44 is held by a cap, not shown, whose position may be adjusted to control the biasing force applied to arm 20. The lower end of spring 44 bears on pin 42 and the lower end of pin 42 bears on arm 20 to apply the biasing force. A scale is formed on pin 42 and the position of the top of the cap on this scale provides a visual indication of the biasing force. It is to be noted that pin 42 follows the movement of axis 16.

The wheel 12 is itself driven by a motor, not shown. In order to protect the wheels 10, 12 during welding, a sacrificial electrode in the form of a copper wire passes through the apparatus following a complex path, this path including passage around each of the wheels 10, 12. As the wire passes around the wheel 10, it applies a torque which ensures that this wheel rotates. In order to perform welding, a series of current pulses are passed between the wheels 10, 12.

As mentioned above, the apparatus shown in FIG. 1 is designed for welding longitudinal seams in metal container bodies. Rectangular metal blanks are supplied to a position to the left of wheel 10 and are bent into a tubular form so as to encircle arm 18. In this tubular form, the longitudinally extending margins of each blank are overlapped with each other. The tubular blanks are fed to the right along the axis of arm 18 so that the overlapping margins are fed into the nip between wheels 10, 12. A tubular blank in this position is indicated by reference numeral 24. As the overlapping margins pass through the nip between wheels 10, 12, a weld 26 is formed, thereby producing a container body having a welded longitudinal seam. An example of such a body is indicated by reference numeral 28.

Figure 3A:
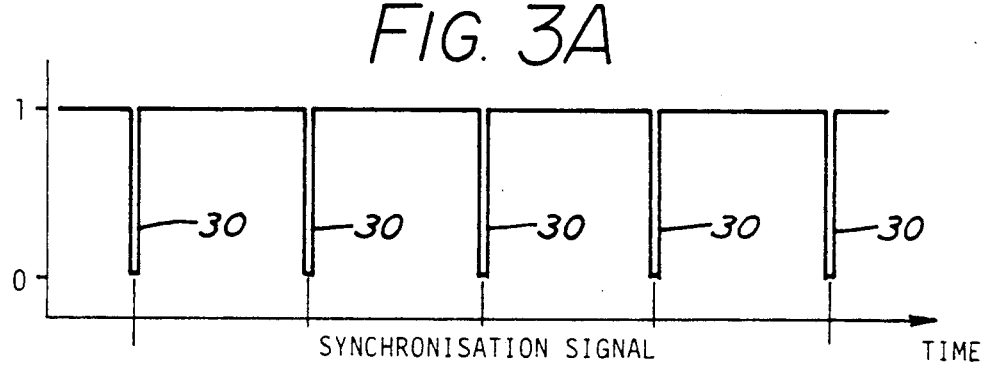
FIGS. 3A and 3B show synchronization pulses and the variation in weld thickness which occurs as the apparatus of FIG. 1 welds a series of container bodies.
Figure 3B:
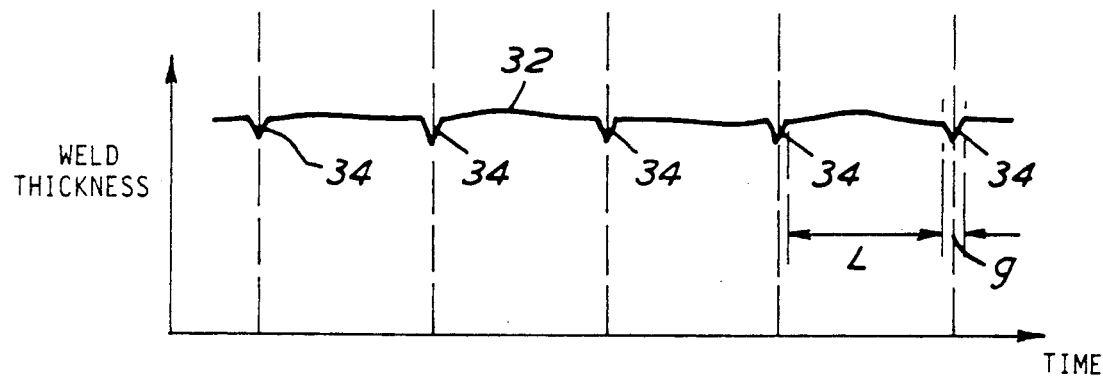

The container bodies pass through the machine in series with a small gap between each adjacent pair. At the commencement of welding of each longitudinal seam, a synchronizing pulse is generated. As the welding of each container body proceeds, small variations occur in the displacement between the axes 14, 16, these variations in displacement corresponding to small variations in weld thickness. Between welding each pair of container bodies, the gap between them causes a temporary slight displacement of the axes 14, 16 towards each other. Referring now to FIG. 3A, there is shown a train of synchronizing pulses, each pulse being indicated by reference numeral 30. FIG. 3 also shows a graph 32 indicating the variation in displacement between axes 14, 16 as welding proceeds, this displacement providing an approximate indication of weld thickness. In FIG. 3B, the displacements caused by the gaps between successive container bodies are indicated by reference numeral 34. In FIG. 3B, each container body has a length L and there is a gap g between successive bodies.

The apparatus which has been described so far is conventional and the modifications to it in accordance with the invention will now be described.

Returning now to FIG. 1, the apparatus includes a Sangamo type AG 2.5 linear displacement transducer 40. The transducer 40 senses displacement of the pin 42 and hence displacement of axis 16. The apparatus also includes a pair of pick-ups 46, 48 which respectively detect the passage of markers 50, 52 located on the peripheries of wheel 12, 10. Thus, pick-ups 50, 52 detect the rotational positions of wheels 12, 10.

Figure 2:
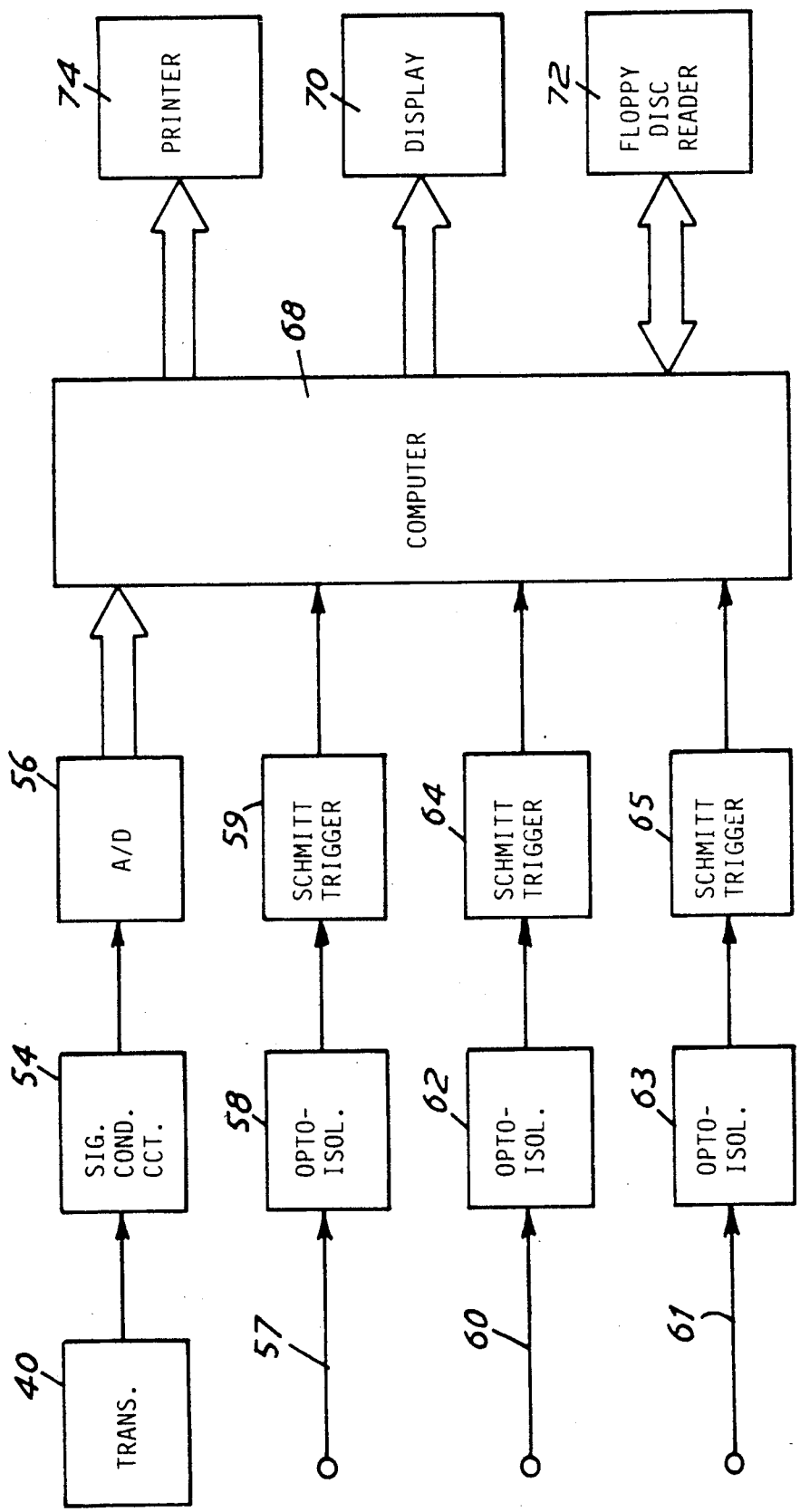
FIG. 2 is a block diagram of a signal processing circuit forming part of the apparatus of FIG. 1.

Referring now to FIG. 2, the output of transducer 40 is supplied to the input of a Sangamo type C31 signal conditioning circuit 54. The output of circuit 54 is supplied to the input of an analog to digital converter 56. The synchronizing pulses 30 shown in FIG. 3 are supplied on line 57 to the input of an opto-isolatar 58, the output of which is connected to the input of a Schmitt trigger circuit 59. The outputs of pick-ups 46 and 48 are supplied on lines 60 and 61 to the inputs of two further optoisolators 62, 63, the outputs of which are supplied to the inputs of two further Schmitt trigger circuits 64, 65. The outputs of analog to digital converter 56 and Schmitt trigger circuits 59, 64, 65 are supplied to respective inputs of a computer 68. Computer 68 has associated therewith a display 70, a reader 72 for storage devices such as floppy discs, and a printer 74.

Inevitably, each of the wheels 10, 12 will be mounted with a small degree of eccentricity relative to its associated axis 14, 16 and there will be irregularities in their surfaces. At periodic srvice intervals, the wheels 10, 12 are normally machined to reduce their surface irregularities. However, between service intervals, it is desirable to monitor their surface irregularities as damage can occur at any time. These eccentricities and irregularities prevent the output of transducer 40 being used directly to measure accurately weld thickness. A method will now be described for measuring the eccentricity and surface irregularities of each of the wheels 10, 12. Two methods will then be described for removing from the output signal of transducer 40 the components which are due to these eccentricities and surface irregularities.

In order to measure the eccentricities and surface irregularities of the wheels 10, 12, the apparatus is operated without feeding metal blanks to the nip between the wheels. The resulting output signal from transducer 40 is divided in computer 68 into two series of individual traces. In the first series of individual traces, each individual trace represents the variation in displacement between axes 14, 16 for a single rotation of wheel 10. The individual traces of the first series are then averaged to produce a first averaged trace. The lower and upper wheels 10, 12 have different circumferences. Consequently, the components in the output signal caused by the surface irregularities and eccentricity of the wheel 12 will be largely removed by the averaging operation. Therefore, the first averaged trace is a trace of the profile, and hence of the eccentricity and surface irregularities, of the wheel 10.

Similarly, in the second series of individual traces, each individual trace represents the variation in displacement between axes 14, 16 for a single rotation of wheel 12. The individual traces of the second series are averaged to produce a second averaged trace and this second averaged trace represents the profile of wheel 12.

The two averaged traces may be displayed on display 70. Conveniently, the two averaged traces are shown as polar plots. Examples of such polar plots for wheels 12 and 10 are shown respectively in FIGS. 4 and 5. In each of these figures, the centre of the axis is shown as point O, the centre of the wheel is shown as point E, and the surface profile is shown by curve P. The distance between points O and E is the eccentricity of the wheel. In each of these figures, the eccentricity and surface profile are shown on a greatly enlarged scale but nearly the whole of the radius of the wheel is omitted. Thus, the profile curve P is contracted towards point E. The irregularities in the surface profile may be seen in each of these figures. In FIG. 5 surface damage is indicated by arrow 76.

By monitoring the profiles of wheels 10, 12 during use of the welding apparatus, damage to, or contamination of, one of the wheels 10, 12 may be detected at an early stage and before weld quality falls below an acceptable standard.

Figure 6:
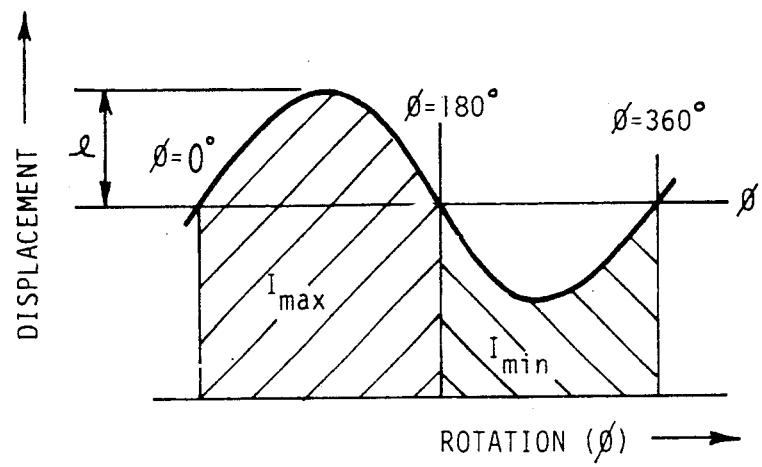
FIGS. 6 and 7 are sketches for explaining mathematical equations used in forming the polar plots of FIGS. 4 and 5.

Due to the irregularities in the profiles of the wheels, it is difficult to use an averaged trace directly to determine the eccentricity of the wheel. Instead, the following procedure is used. The averaged trace is integrated with respect to an arbitrary zero over an interval corresponding to 180° of rotation of the wheel. The integration is then repeated for a set of 180° intervals, each of which is moved forwards by a few degrees with respect to the previous interval. In this way, the 180° intervals which produce the largest and smallest integral values, Imax and Imin, are found. This situation is illustrated in FIG. 6. In FIG. 6, rotation is indicated by angle O. For simplicity the averaged trace is shown as a pure sine wave though, in reality, it will be irregular.

It may easily be shown that the integral values Imax and Imin and the eccentricity e are related as follows:

$$Imax - Imin = 2e \int_{0°}^{180°} \sin\phi d\phi = 4e$$

Hence, e = (Imax − Imin)/4.

Figure 4:
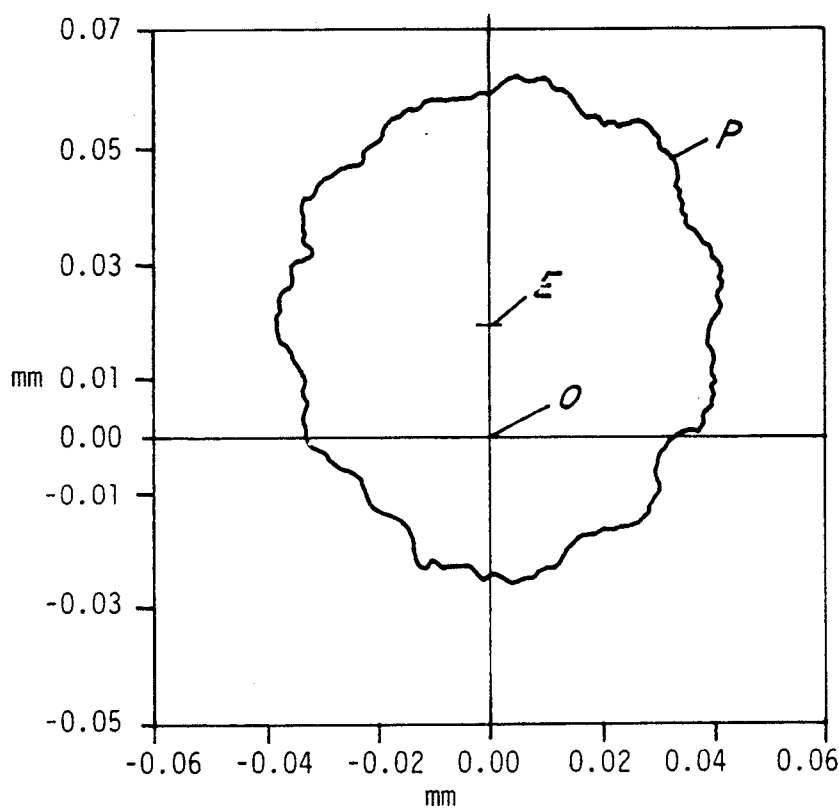
FIGS. 4 and 5 are polar plots of the surface profiles of the upper and lower electrode wheels of the apparatus of FIG. 1.
Figure 5:
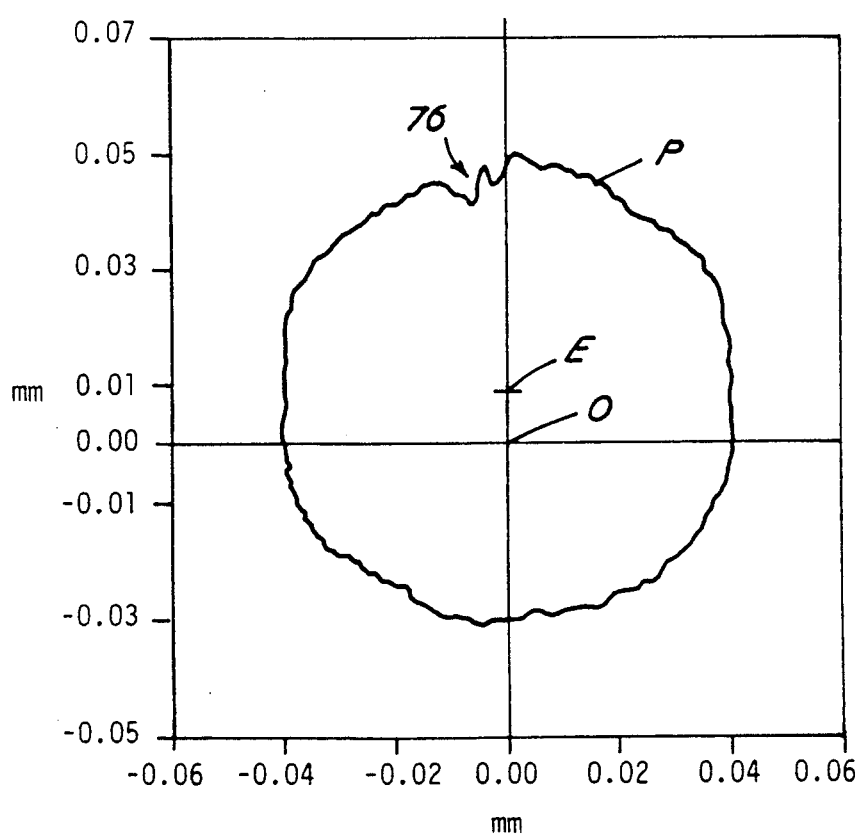
Figure 7:
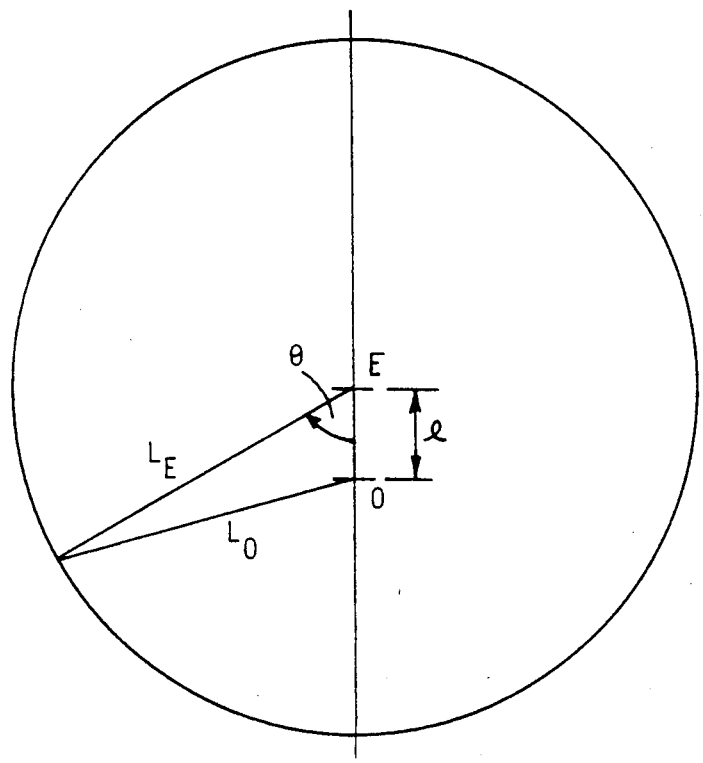

In producing one of the polar plots shown in FIGS. 4 and 5, the following problem arises. The distance Lo between a point on the surface profile P and the centre O of the axis is not the same as the distance $L_E$ between the point on the profile and the centre E of the wheel. This problem is illustrated in FIG. 7. In order to solve this problem, for a particular polar angle $\theta$, the distance $L_E$ is calculated by the following equation:

$$L_E = e \cos\theta + \sqrt{(Lo^2 - e^2 \sin^2\theta)}$$

There will now be describe the first method of removing from the output signal of transducer 40 the components which are due to the surface irregularities and eccentricities of the wheels 10, 12. In this first method, a trace of the profile of each of the wheels, 10, 12 is stored in the memory of computer 40. These traces may be obtained in the manner described above.

During a normal welding operation, the computer 68 subtracts the trace of the profile of wheel 12 from the output of transducer 40. This subtraction is performed in real time and reference singnals from pick-up 46 are used to ensure that the subtraction is performed in phase with the actual position of wheel 12. As a result of the subtraction, there is produced a partially corrected output signal. In a similar manner, the trace of the profile of wheel 10 is then subtracted from the partially corrected output signal. This subtraction is performed in phase with the actual position of wheel 10 using reference signals from pick-up 48. As a result of this subtraction, there is produced a fully corrected output signal.

Figure 8:
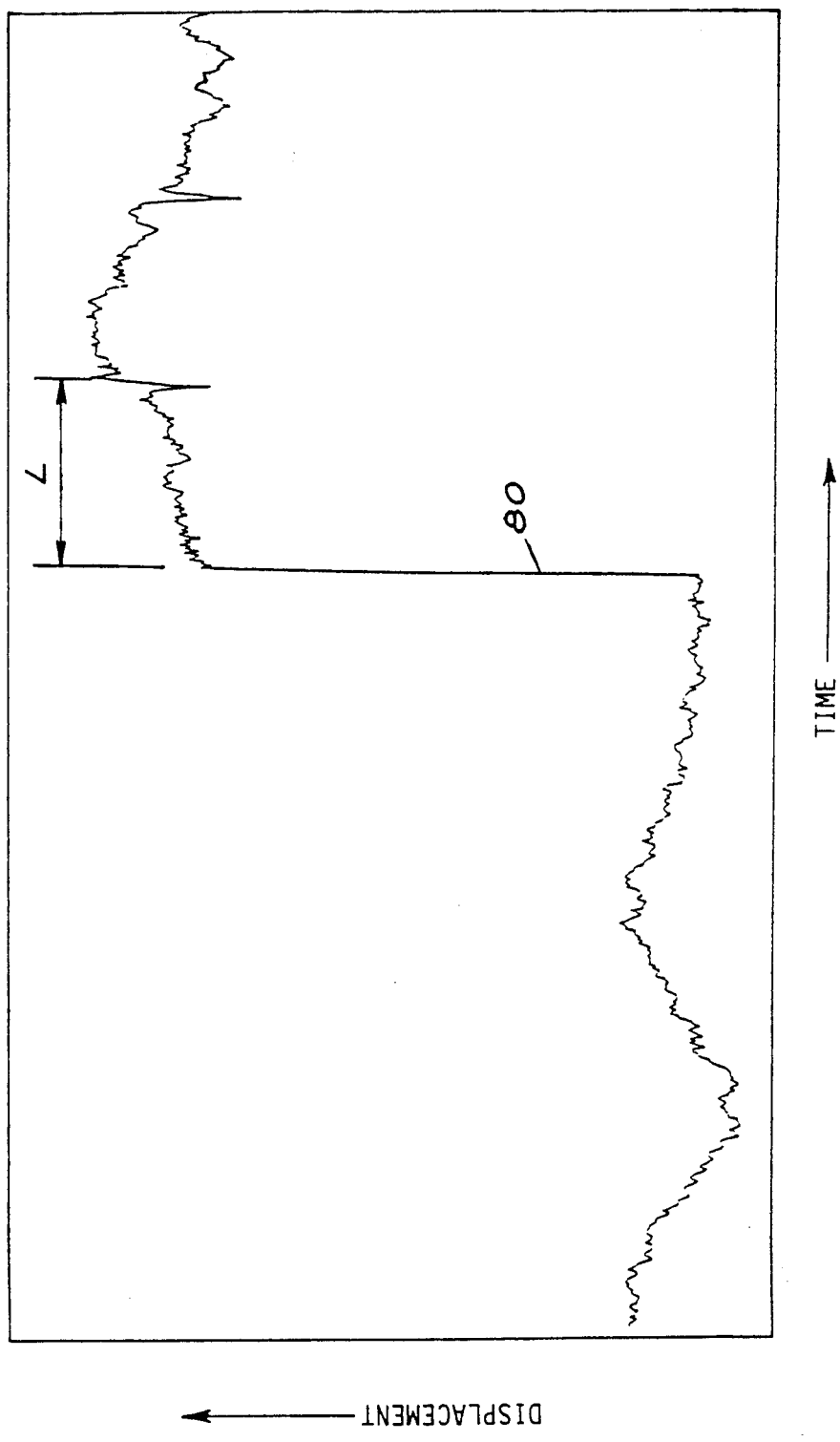
FIG. 8 shows the variation in displacement between the two electrode wheels forming part of the apparatus of FIG. 1 as welding proceeds.

Referring now to FIG. 8, there is shown the output signal of transducer 40 in its uncorrected form. In the left hand half of FIG. 4 there is shown the output signal with both wheels 10, 12 rotating but before the first container reaches the nip between the two wheels. In the right hand half of FIG. 4, there is shown the output signal as a series of containers pass between the wheels. The substantial displacement which occurs as the first container body enters the nip between the two wheels is shown by the vertical line 80. The length of a single container body is indicated by arrow L. As may be seen in FIG. 4, there is considerable random variation in the output signal and, as has been explained, this is due largely to irregularities in the profiles of the two wheels 10, 12 and their eccentricities.

Figure 9:
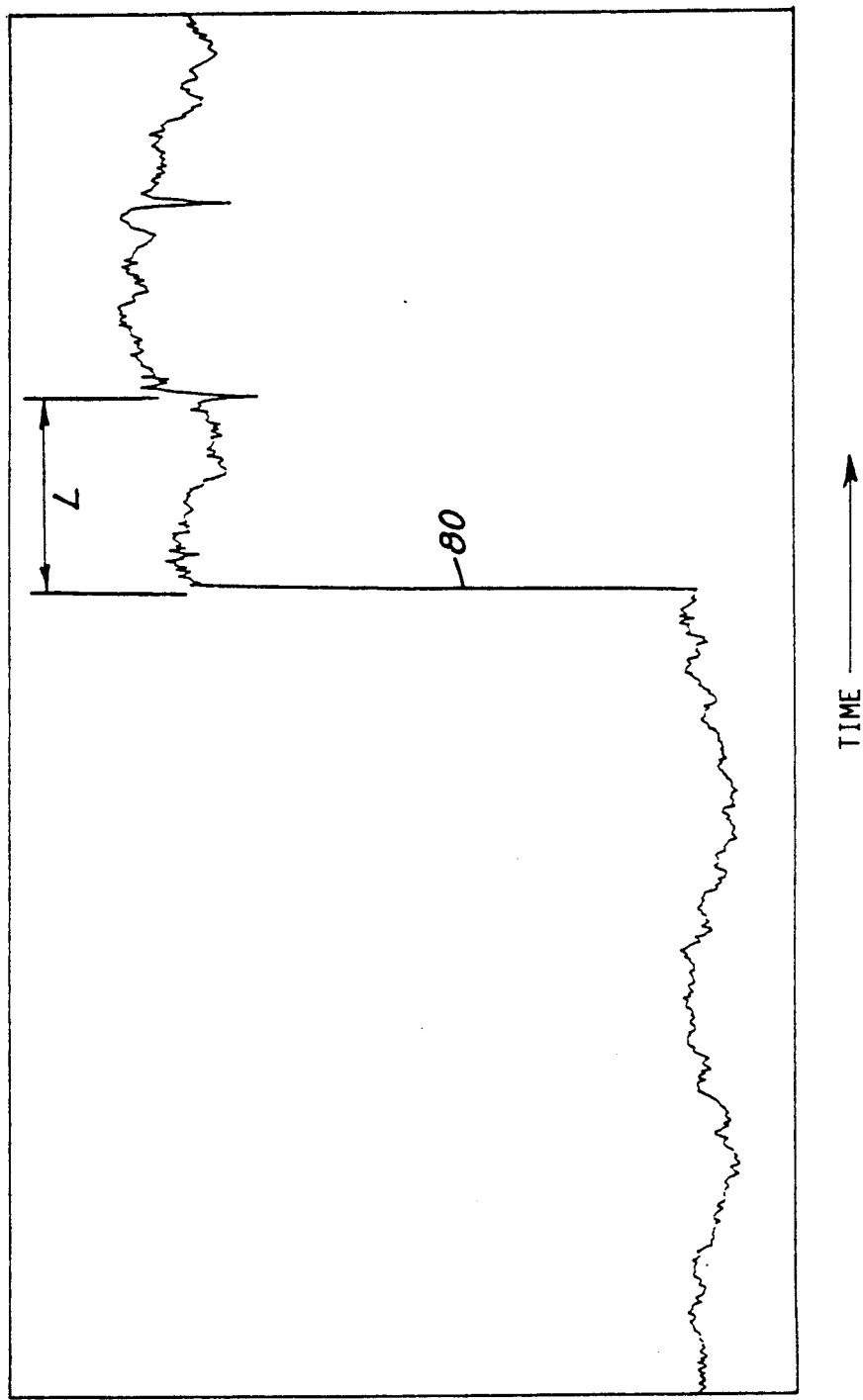
FIG. 9 shows the variation in displacement between the two electrode wheels corrected for the eccentricity and surface irregularity of the upper electrode wheel.

Referring now to FIG. 9, there is shown a graph of the output signal after is has been partially corrected by subtracting the profile of wheel 12. As with the graph of FIG. 8, the left hand side shows the output signal before the first container body reaches the wheels 10, 12 the right hand half shows the output signal as a series of container bodies pass between the wheels, and the transition between the two is indicated by reference numeral 80. As may be seen, the random variations in the output signal are much less than in FIG. 8. The partially corrected output signal as illustrated in FIG. 9 may provide a satisfactory indication of weld thickness and thereby avoid the need of performing the second subtraction.

Figure 10:
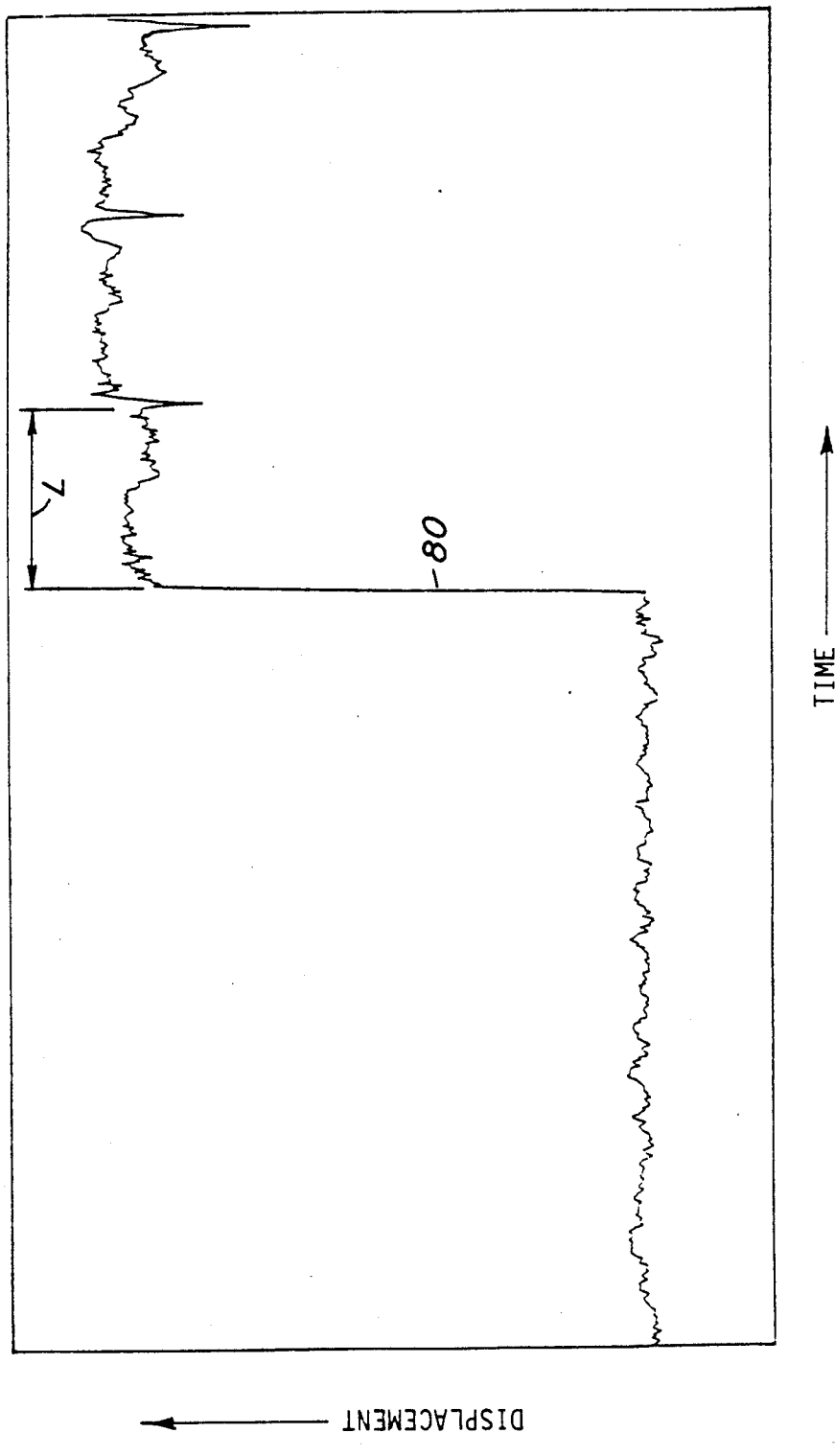
FIG. 10 shows the variation in displacement between the electrode wheels corrected for the eccentricities and surface irregularities of both electrode wheels.

Referring now to FIG. 10, there is shown a graph of the output signal after it has been fully corrected by substracting the profile of wheel 10. As may be seen particularly in the left hand side of FIG. 10, the residual random variations in the fully corrected output signal are minimal. The variations which can be seen in the right hand half of FIG. 10 largely represent actual variations in weld thickness.

The second method of removing the components due to surface irregularities and eccentricities will now be described. In this method, the output signal from transducer 40 is divided in computer 68 into a series of individual traces, each of which represents the variations in displacement between the axes 14, 16 for a single container body. A suitable number, for example sixteen, of the traces are averaged to produce an averaged trace. The length of a typical container body is equal to neither the circumference of wheel 12 nor the circumference of wheel 10. Consequently, as a result of the averaging operation, the components caused by surface irregularities and eccentricities will be largely removed.

Figure 11:
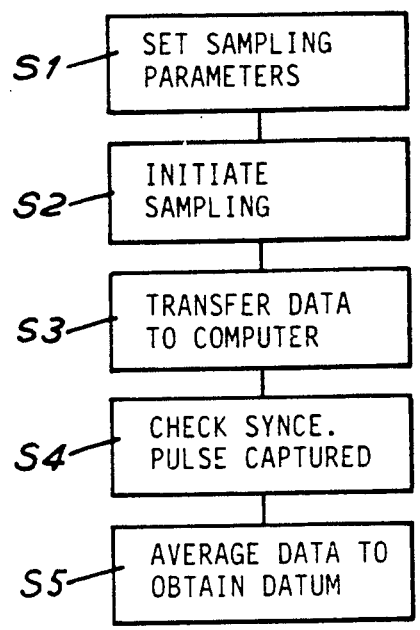
FIGS. 11 and 12 are flow charts illustrating a method of measuring weld thickness.
Figure 12:
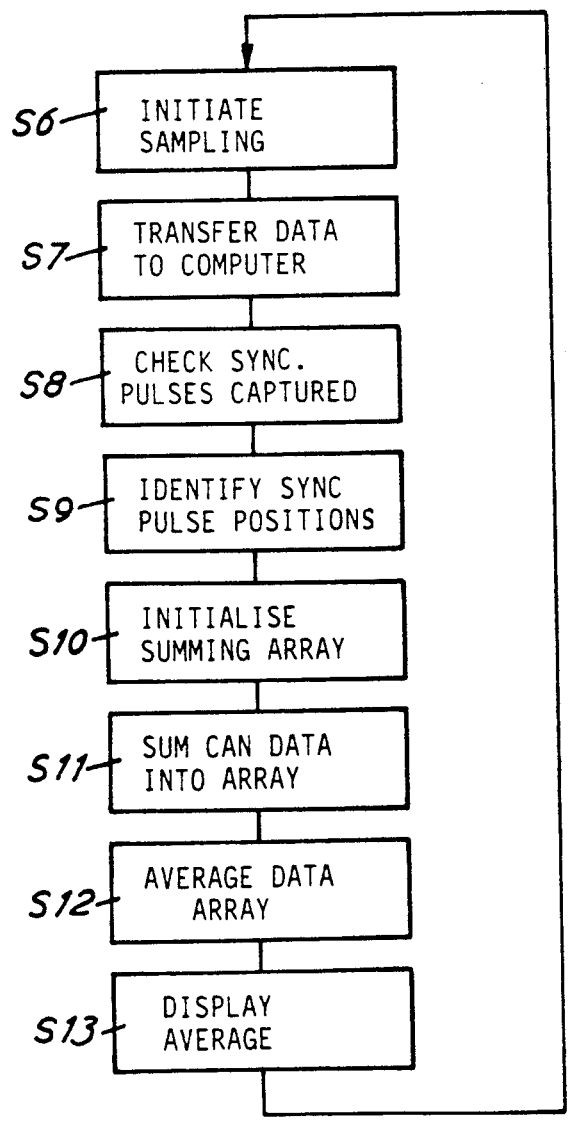

Referring now to FIG. 11 and 12, there is shown the flow chart for the computer program used in the second method. This program comprises an initial routine shown in FIG. 11 in which a datum value is obtained for the weld thickness and a main routine shown in FIG. 12.

The initial routine commences with a step S1 in which the sampling parameters are set. These include the total period of each sampling operation and the sampling frequency. For example, the total period may be that required to weld twenty container bodies. In a step S2, sampling is initiated. During sampling, the analog output signal from transducer 40 is converted into a series of digital values and these digital values are stored together with the synchronizing pulses as data in a memory in the analog to digital converter. In a step S3, the data is transferred to the computer. In a step S4, the data is checked for capture of the synchronizing pulse. Without the synchronizing pulses, the averaged trace cannot be obtained. In a step S5, the data values obtained from the output of transducer 40 are averaged to obtain a datum value.

In the main routine, in a step S6 sampling is initiated in the same manner as in step S2. In a step S7, data is transferred from the analog to digital converter to the computer and, in a step S8, the data is checked for capture of the synchronizing pulses.

In a step S9, the positions of the synchronizing pulse relative to the data obtained from transducer 40 are identified. Thus, this data is divided into sets, each set corresponding to the series of data values obtained while a single can body passes between the electrode wheels. Each set of data also corresponds to one of the individual traces mentioned above.

In a step S10, a summing array is initialized in preparation for receiving the sets of data. For example, an initial value may be entered at each address in the array so as to relate the data to the datum value established in step S5. In a step S11, the data is summed into the array. In doing this, each set of data is summed into a respective row of the array. Successive rows then contain data for successive cans. In a step S12, the data in each column is averaged thereby producing an averaged set of data. In a step S13, the averaged set of data is displayed as a graph on display 70. The program then returns to step S6 and a new sampling operation is performed.

With each of the two methods described above for processing the data relating to weld thickness, the results obtained may be displayed graphically, thus providing the operator of the welding apparatus with information on the welds being produced. Values for the average weld thickness along the whole can length or the thickness at a particular position may be also displayed. If the thickness falls outside acceptable limits, a warning may be given or operation of the welding apparatus may be stopped automatically. In the first method, data is produced for each individual can body and so this method may be used to detect welding faults in individual can bodies.

Figure 13:
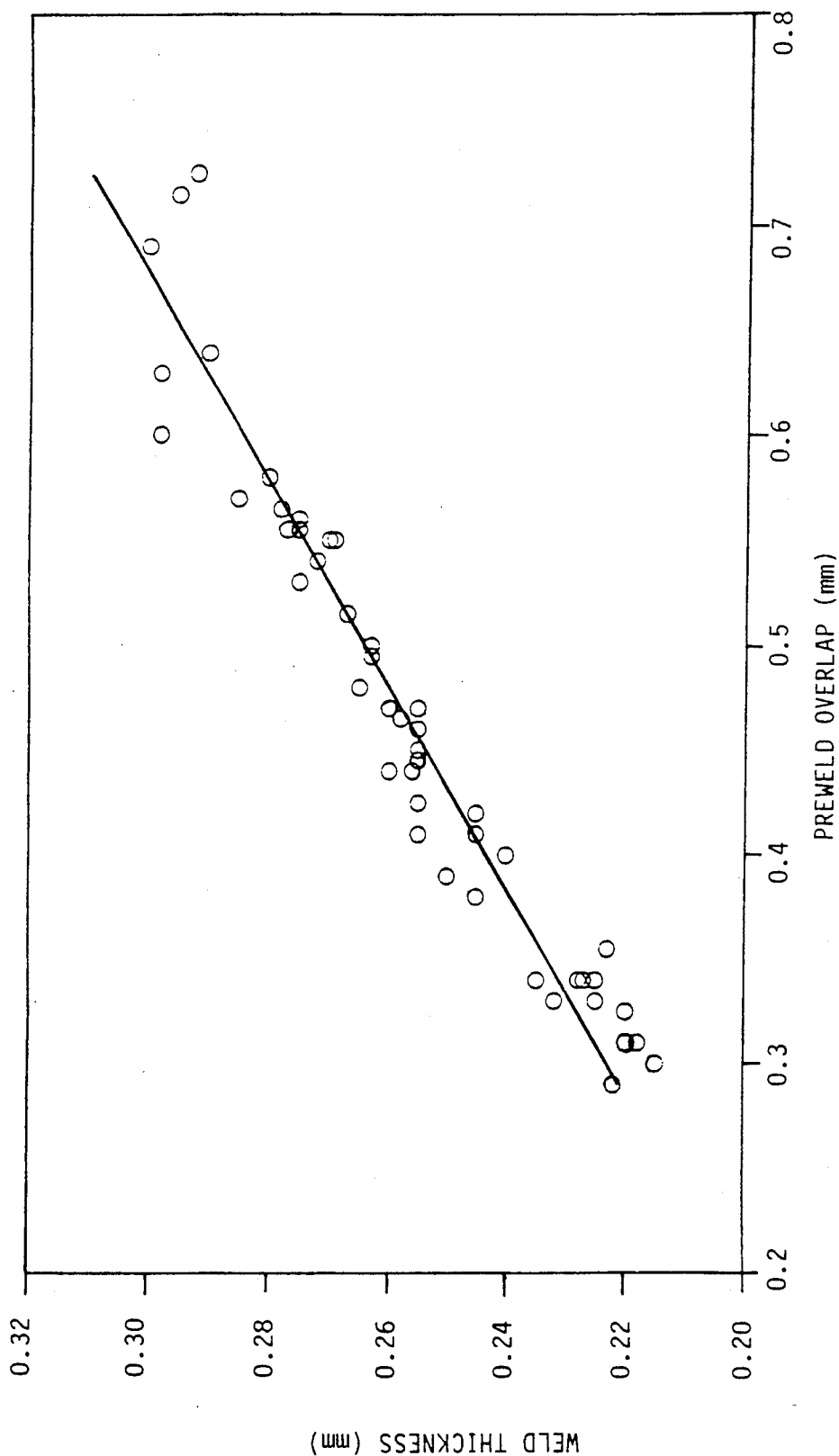
FIG. 13 is a graph illustrating the correlation between weld thickness and preweld overlap.

The data on weld thickness may be used to detect errors in the settings of the welding apparatus. FIG. 13 is a graph of weld thickness plotted against the amount of overlap between the margins in each container body prior to welding. This overlap, in turn, is controlled by settings in the welding apparatus. The data for graph 13 were obtained by using a variety of machine settings. An overlap in the range 0.4 to 0.6 mm is regarded as acceptable. As may be seen, the thickness correlates closely with the overlap. Consequently, if the average thickness of the welds in container bodies departs from a desired value, this may be readily corrected by changing the setting so as to vary the overlap in the required direction.

Although not shown in FIG. 1, as each container body passes through the nip between the electrode wheels 10, 12, the whole of the outer surface is engaged by a set of support wheels. These support wheels are mounted on a carrier, the longitudinal position of which may be varied to obtain a correct setting. If its position departs from the correct setting, then errors occur in the welds.

Figure 14:
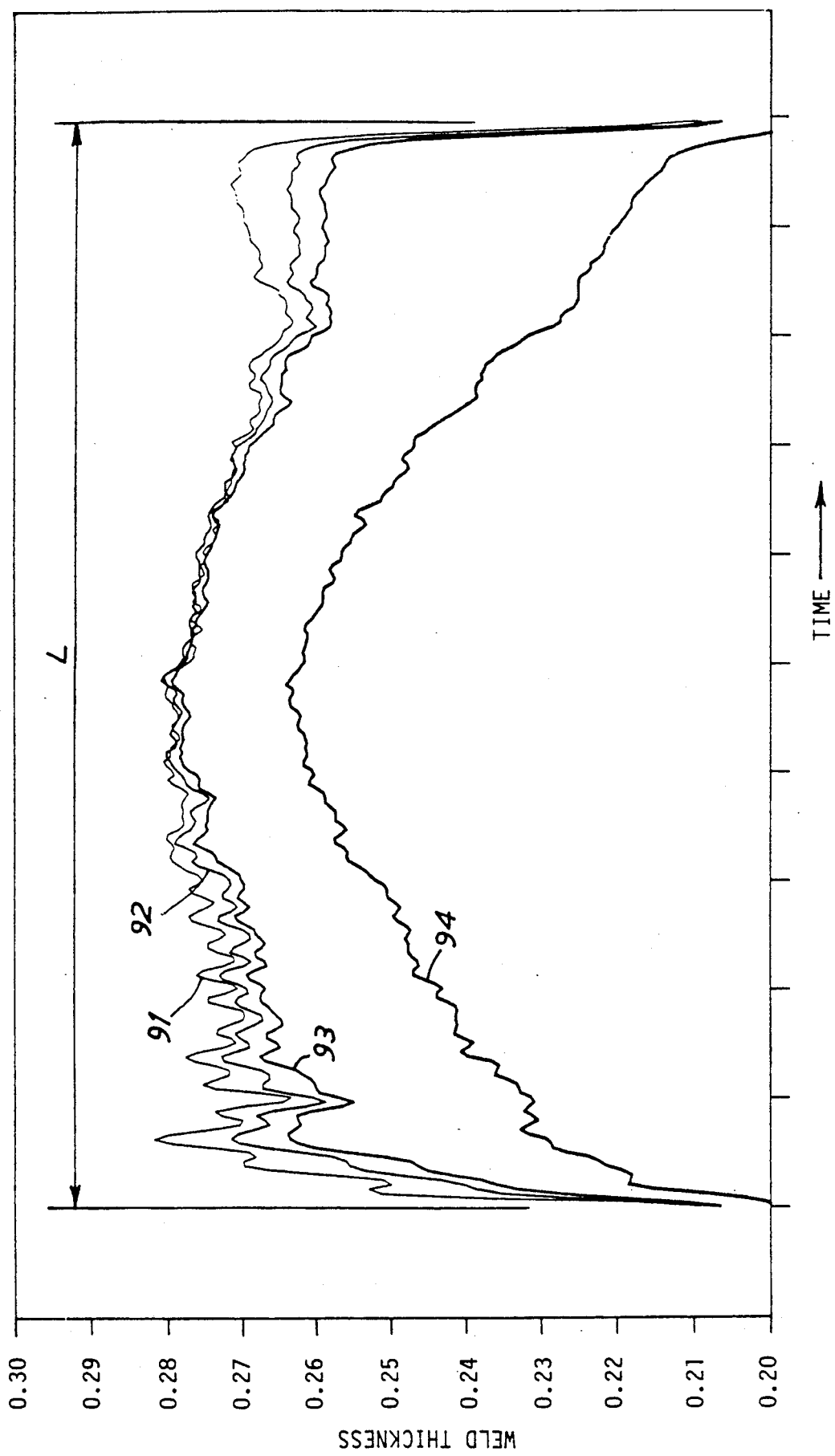
FIG. 14 shows the effect of moving the position of support wheels on weld thickness.

Referring now to FIG. 14, there is shown a series of traces 91 to 94 obtained by the second method. Between each pair of traces, the carrier holding the support wheels was moved a short distance downstream. In FIG. 14, the length of a single can is indicated by arrow L. In trace 91, the weld exhibits a slight, but acceptable, thickening at the beginning and end of the container body. This thickening is caused by the carrier being located slightly too far upstream. The variations in thickness indicated by traces 92 and 93 are satisfactory and these traces represent optimum positions for the carrier. In trace 94, the weld has insufficient thickness at the beginning and end of the container body and this caused by locating the carrier too far downstream. Thus, the present invention can be used to set the carrier to an optimum position.

Although the present invention has been described with reference to forming a longitudinal seam in a container body, it may also be used for monitoring weld thickness in other types of workpieces.

We claim:

1. Resistance welding apparatus comprising first and second electrode wheel means for forming resistance welds in a series of work-pieces, the first and second electrode wheel means being mounted for displacement relative to each other, displacement sensing means for sensing the relative displacement between the first and second electrode wheel means and for producing an output signal which varies with time as the wheel means rotate, and correction means for processing the output signal to remove or reduce the components in the output signal which relate to the eccentricity and surface irregularities of at least one of said electrode wheel means.

2. Resistance welding apparatus as claimed in claim 1, in which the correction means divides the output signal into a series of individual traces and averages a plurality of individual traces to produce an average trace.

3. Resistance welding apparatus as claimed in claim 1, in which the correction means produces a series of individual traces each of which represents the variation in displacement between the first and second electrode wheel means during a single rotation of a selected one of said electrode wheel means, and in which the correction means averages a plurality of said individual traces to produce an averaged trace representative of the surface profile of said selected electrode wheel means.

4. Resistance welding apparatus as claimed in claim 1 or claim 3, including a detecting means for detecting the rotational position of one of said electrode wheel means, and in which the correction means, which is responsive to the detecting means, has stored therein a profile trace representative of the surface profile of said one electrode wheel means, and subtracts said profile trace from the output signal of the displacement sensing means in phase with the rotational position of said one electrode wheel means to produce a corrected output signal.

5. Resistance welding apparatus as claimed in claim 1 or claim 3, including a first detecting means for detecting the rotational position of the first electrode wheel means, a second detecting means for detecting the rotational position of the second electrode wheel means, and in which the correction means, which is responsive to the first and second detecting means, has stored therein first and second profile traces representative, respectively, of the surface profiles of the first and second electrode wheel means, and subtracts the first profile trace from the output signal of the displacement sensing means in phase with the rotational position of the first electrode wheel means to produce a partially corrected output signal, as well as subtracts the second profile trace from the partially corrected output signal in phase with the rotational position of the second electrode wheel means to produce a fully corrected output signal.

6. Resistance welding apparatus as claimed in claim 1 or claim 3, in which the correction means produces a series of individual traces from said output signal, each trace representing the variation in displacement between the first and second electrode wheel means while a welding operation is performed on an individual workpiece and in which the correction means averages a plurality of individual traces to produce an average trace.

7. Resistance welding apparatus as claimed in claim 1 or claim 2, in which one of the electrode wheel means is mounted for rotation about a fixed axis, the other of the electrode wheel means is mounted for rotation about a movable axis, and in which the displacement sensing means is arranged to sense the displacement of the second axis.

8. A method of monitoring resistance welding apparatus having first and second electrode wheels mounted for displacement relative to each other and arranged to form welds in workpieces, said method comprising the steps of: sensing relative displacement between the first and second electrode wheels to produce an output signal which varies with time as the wheels rotate, and processing the output signal to remove or reduce the components in the output signal which relate to the eccentricity and surface irregularities of at least one of said electrode wheels.

9. A method as claimed in claim 8 wherein the processing step comprises dividing the output signal into a series of traces and averaging a plurality of individual traces to produce an averaged trace.

10. A method as claimed in claim 8 wherein the processing step comprises dividing the output signal into a series of traces each of which represents the variation in displacement between the first and second electrode wheels during a single rotation of a selected one of said electrode wheels, and averaging a plurality of individual traces to produce an averaged trace representative of the surface profile of said selected electrode wheel.

11. A method as claimed in claim 8 or claim 10 including the steps of detecting the rotational position of one of said electrode wheels, and storing a profile trace representative of the surface profile of said one electrode wheel, and wherein the processing step comprises subtracting said profile trace from the output signal in phase with the rotational position of said one electrode wheel to produce a corrected output signal.

12. A method as claimed in claim 8 or claim 10 including the steps of detecting the rotational position of the first electrode wheel, detecting the rotational position of the second electrode wheel, and storing first and second profile traces representative, respectively, of the surface profiles of the first and second electrode wheels, and wherein the processing step comprises subtracting the first profile trace from the output signal in phase with the rotational position of the first electrode wheel to produce a partially corrected output signal, and subtracting the second profile trace from the partially corrected output signal in phase with the rotation position of the second electrode wheel to produce a fully corrected output signal.

13. A method as claimed in claim 8 or claim 10 wherein the processing step comprises dividing the output signal into a series of individual traces each of which represents the variation in displacement between the two electrode wheels while a welding operation is performed on an individual workpiece, and averaging a plurality of individual traces to produce an averaged trace.

* * * * *